United States Patent [19]
Matsu et al.

[11] Patent Number: 5,884,936
[45] Date of Patent: Mar. 23, 1999

[54] STEERING WHEEL ASSEMBLY WITH SELF-DOCKING CONNECTOR

[75] Inventors: Richard L. Matsu, Plymouth; John Curtis Hofer, Troy, both of Mich.

[73] Assignee: Breed Automotive Technology, Inc., Lakeland, Fla.

[21] Appl. No.: 827,281

[22] Filed: Mar. 27, 1997

[51] Int. Cl.⁶ ................................................ B60R 21/16
[52] U.S. Cl. ......................... 280/728.2; 439/15; 74/552
[58] Field of Search ................................ 280/731, 728.2; 439/15, 164; 74/492, 552

[56] References Cited

U.S. PATENT DOCUMENTS

| | | | |
|---|---|---|---|
| 4,844,359 | 7/1989 | Kato | 280/731 |
| 5,171,157 | 12/1992 | Bolen | 439/15 |
| 5,704,633 | 1/1998 | Durrani et al. | 280/731 |

Primary Examiner—Paul N. Dickson
Attorney, Agent, or Firm—Howard & Howard

[57] ABSTRACT

A vehicle steering assembly provides improved installation of a steering wheel assembly onto a steering column assembly. The steering wheel assembly includes a first mating cylinder having a key formed on its inner surface. A steering column assembly includes a second mating cylinder having an outer diameter less than the inner diameter of the first mating cylinder includes an axial guide on its outer surface. During installation, the second mating cylinder is inserted partially into the first mating cylinder. The steering wheel assembly is then rotated until the key is aligned with the axial guide. The second mating cylinder is then inserted into the first mating cylinder to a second position in which a first electrical connector on the steering wheel assembly engages a second electrical connector on the steering column assembly.

22 Claims, 4 Drawing Sheets

STEERING WHEEL ASSEMBLY WITH SELF-DOCKING CONNECTOR

BACKGROUND OF THE INVENTION

The present invention relates to a mechanism which facilitates installation of a steering wheel assembly onto a steering column assembly while making the necessary electrical connections between the steering wheel assembly and the vehicle electrical system.

Prior to the introduction of modular steering wheels, also known as wheel air bags, steering wheel assemblies could be attached to the steering shaft in a straightforward manner. Installation of the steering wheel assembly onto the steering shaft was made while viewing the shaft through the hub of the steering wheel from the front face (driver's side) and guiding the steering wheel into place. A nut or bolt was then affixed to the top of the shaft, using the available access through the front face of the steering wheel, and was tightened to pull the steering wheel assembly into its proper functional position. At this point the driver's air bag module was loaded into the open face of the wheel, covering the hub area, and was held in place using fasteners driven through the wheel armature from the back side of the steering wheel assembly.

In order to reduce assembly time and labor cost and to improve the Class A surface appearance, a modular wheel was developed. The modular wheel comprises a steering wheel assembly molded such that the air bag cover and steering wheel Class A surface are molded as one, an air bag module loaded into this molded assembly from the rear or bottom, a hub plate with attachment points to the molded assembly and the steering shaft, and attachment hardware, generally embedded in the hub plate. This assembly is such that the former attachment method is no longer valid. The wheel and air bag module are installed as one unit and there is no longer access to the steering shaft through the face of the steering wheel assembly. This makes it somewhat more difficult to mate up the hub of the steering wheel with the steering shaft.

It should be noted that during steering wheel assembly various electrical connections must be made between the steering wheel and the vehicle electrical system to power the horn, air bag inflator, and, frequently, additional accessories. These connections are generally made by plugging one or more pigtail connectors located on the steering column into complimentary mating pigtail connectors on the steering wheel assembly. There is always the danger that one or more of these pigtail leads may be damaged during installation and this danger may be exacerbated during blind assembly.

SUMMARY OF THE INVENTION

The present invention facilitates attachment of the steering wheel assembly to the steering column. All required electrical connections between the steering wheel assembly and the vehicle electrical system are made automatically while the steering wheel assembly is being installed onto the shaft; no separate operation or manipulation is required to make the electrical connections. The electrical connection between the steering wheel assembly and the vehicle electrical system takes place only after the steering wheel assembly is sufficiently aligned such that damages to the connector interface cannot occur. Electrical connection will be achieved regardless of any manufacturing variance occurring in the steering wheel assembly or the steering column assembly.

The steering wheel assembly generally comprises a steering wheel and airbag module mounted to a hub plate. The steering wheel assembly further includes a first mating cylinder and a first electrical connector body each extending downwardly from the steering wheel assembly.

The steering column assembly generally comprises a steering column shaft and a collar assembly. The collar assembly generally comprises a mating cylinder extending upwardly from an annular, generally planar base. A second electrical connector body extends axially upwardly from the base adjacent the mating cylinder.

The mating cylinder of the steering wheel assembly is matable to the mating cylinder of the steering column assembly. One of the mating cylinders has an outer diameter less than the inner diameter of the other. Further, the inner cylinder includes a pair of V-shaped axial guides on its outer surface. The radially outer edge of the inner mating cylinder forms an abutment surface which tapers into the axial guides. The inner surface of the outer cylinder preferably includes a pair of keys projecting radially inwardly and complementary to the axial guides. The keys are spaced axially away from the mating end of the outer cylinder.

During assembly, the inner mating cylinder is inserted partially into the outer mating cylinder until the key on the inner surface of the outer cylinder abuts the abutment surface of the inner cylinder, if the steering wheel assembly and the steering column assembly are not properly rotationally aligned. The steering wheel assembly is then rotated slightly until the installer can feel the keys on the inner surface of the outer cylinder ride along the taper of the axial guide, permitting further axial travel of the steering wheel assembly. As the steering wheel assembly continues to travel towards the steering column assembly, the keys and axial guides more precisely rotationally align the steering wheel assembly and steering column assembly. When sufficient rotational alignment is achieved, the first electrical connector body engages the second electrical connector body on the steering column assembly.

After the connector bodies are aligned, further movement engages the pins to the pin sockets, thereby providing an electrical connection from the steering wheel assembly to the steering column assembly. Continued axial movement of the steering wheel assembly causes the clock spring lock to disengage. This allows the steering wheel to rotate independently of the connector body so that the steering wheel can be rotated about its axis. The steering wheel is then rotated relative to the steering column shaft to align the steering wheel to the steering column shaft. Typically the shaft includes a plurality of circumferentially spaced splines which engage the steering wheel. One or more splines on the shaft are omitted to permit the steering wheel to engage the shaft only when the steering wheel is in a proper orientation relative to the wheels of the vehicle. The steering wheel assembly is then secured to the steering column assembly, preferably using a gear and worm as disclosed in copending application U.S. Ser. No. 08/522,627 filed Sep. 1, 1995, the assignee of which is the assignee of the present invention. Because the steering wheel assembly is secured to the steering column assembly, the connector bodies need not include a locking feature to prevent separation.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
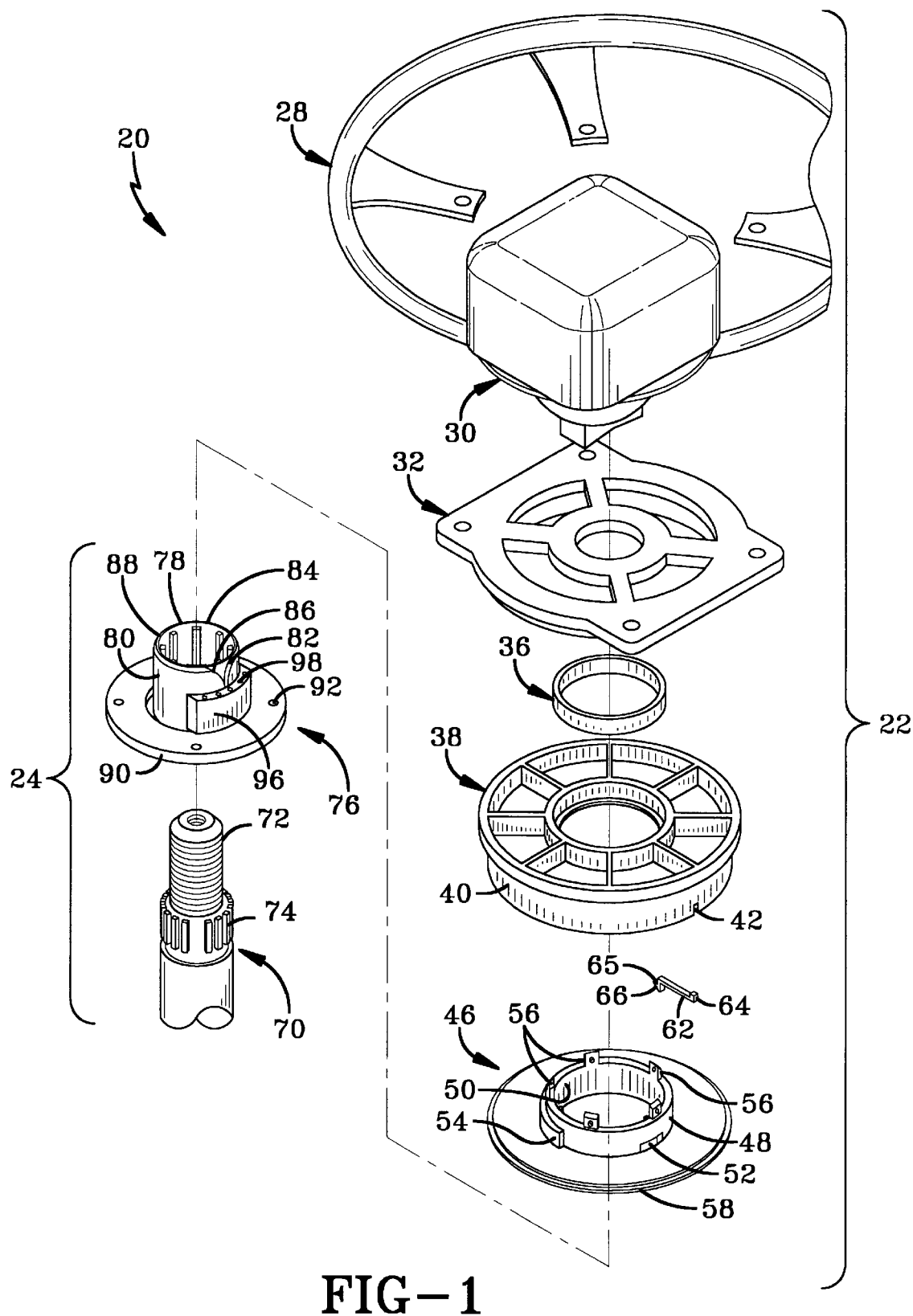
FIG. 1 is an exploded perspective view of the vehicle steering assembly of the present invention.

A vehicle steering assembly 20 having an improved steering wheel assembly 22 and an improved steering column assembly 24 facilitates the installation of the steering wheel assembly 22 onto the steering column assembly 24. As shown in FIG. 1, the steering wheel assembly 22 comprises a steering wheel armature 28, airbag assembly 30 and hub plate 32. These may be as disclosed in copending application U.S. Ser. No. 08/522,627 filed Sep. 1, 1995, the assignee of which is the assignee of the present invention. The steering wheel assembly 22 further includes a retainer ring 36 and a clock spring housing 38. The clock spring housing 38 includes a cylindrical wall 40 having a locking notch 42.

The steering wheel assembly 22 further includes a rotor 46. The rotor 46 includes an outer cylindrical wall 48 and a concentric cylindrical inner wall 50 spaced radially inwardly from the outer wall 48. The outer wall 48 includes an orifice 52. As is well known in clock spring assemblies for steering wheel assemblies, a ribbon wire 54 is coiled about the outer wall 48 of the rotor 46. In the present invention, the ribbon wire 54 is coiled about the outer wall 48 and leads into the orifice 52 through the outer wall 48 for connection to a connector body, which will be described below. A plurality of tabs 56 for connection to the retainer ring 36 extend upwardly from the inner wall 50. The outer wall 48 of the rotor 46 is preferably integral with an annular, generally planar clockspring housing cover 58. The steering wheel assembly further includes a locking pin 62 having an upwardly extending locking finger 64 at one end and a ramp surface 66 at an opposite end 65.

The steering column assembly 24 comprises a steering shaft 70 having a threaded outer end 72 and a plurality of circumferentially spaced splines 74. The steering column assembly 24 further includes a collar assembly 76. The collar assembly 76 includes an inner cylindrical wall 78 and a concentric outer cylindrical wall 80 adjacent or spaced radially from the inner cylindrical wall 78. The outer cylindrical wall 80 includes an axial abutment surface 82 generally about the circumference of the axial outer end 84 of the outer wall 80. The axial abutment surface 82 tapers axially away from the axial outer end 84 to form an axial guide 86. A second axial guide 88 is circumferentially spaced from the axial guide 86, preferably by approximately 135 degrees. The collar assembly 76 further preferably includes a generally planar annular base 90 formed opposite the outer end 84. The base 90 preferably includes a plurality of circumferentially spaced apertures 92 for securing the collar assembly 76 to a surface. A first electrical connector body 96 extends upwardly from the base 90 and is spaced radially outwardly from the outer wall 80. The first electrical connector body 96 includes a plurality of pin sockets 98.

Figure 2:
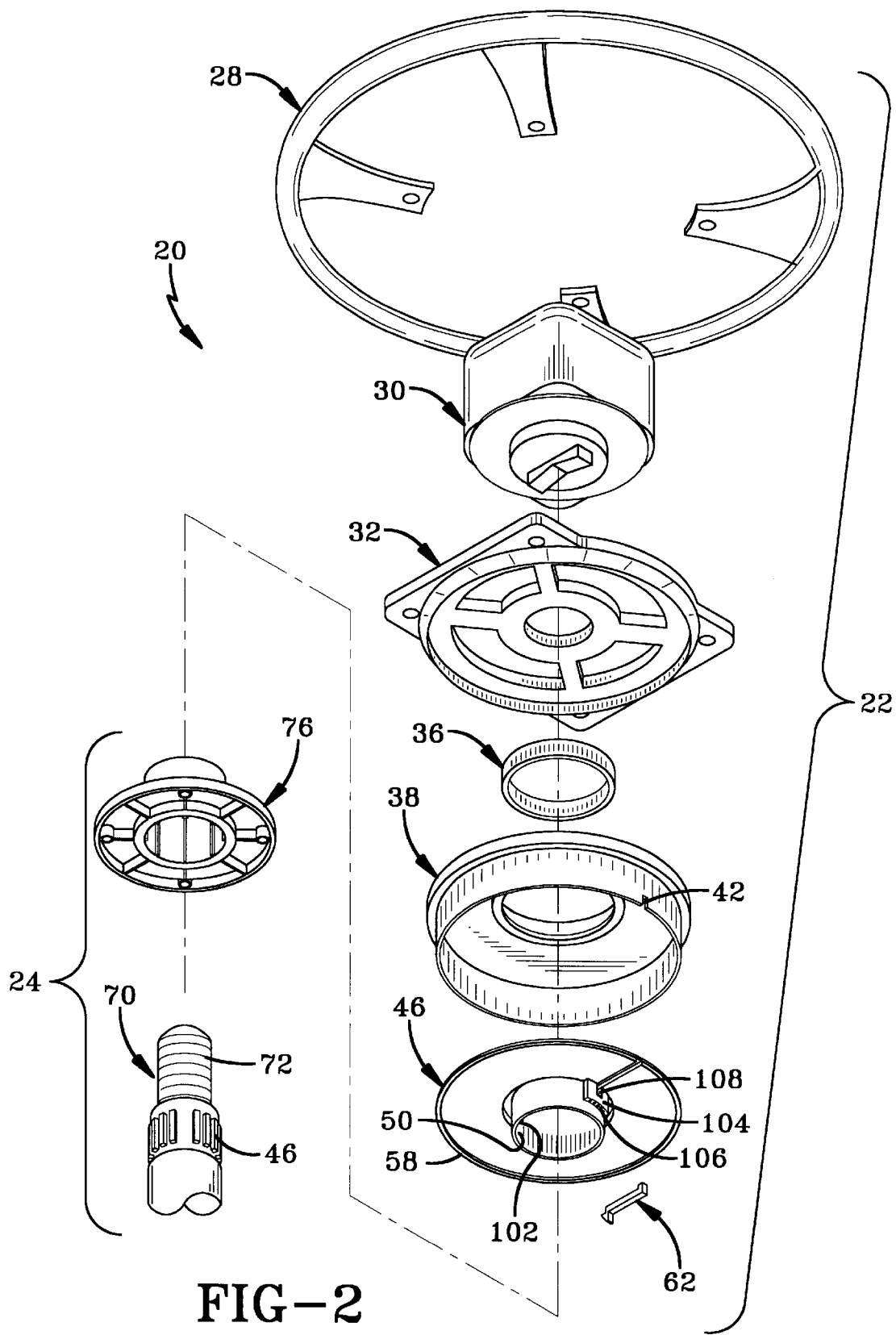
FIG. 2 is an exploded different perspective view of the vehicle steering assembly of FIG. 1.

As can be seen in FIG. 2, the inner wall 50 of the rotor 46 extends downwardly past the clockspring housing cover 58. Axially extending keys 102 are formed on the inner surface of the inner wall 50. A second electrical connector body 104 is formed adjacent the inner wall 50 extending downwardly from the clockspring housing cover 58. The second electrical connector body 104 includes a plurality of pins 106 matable to the pin sockets 98 (not shown) in the first electrical connector body 96. The second electrical connector body 104 further preferably includes a locking notch 108.

Figure 3:
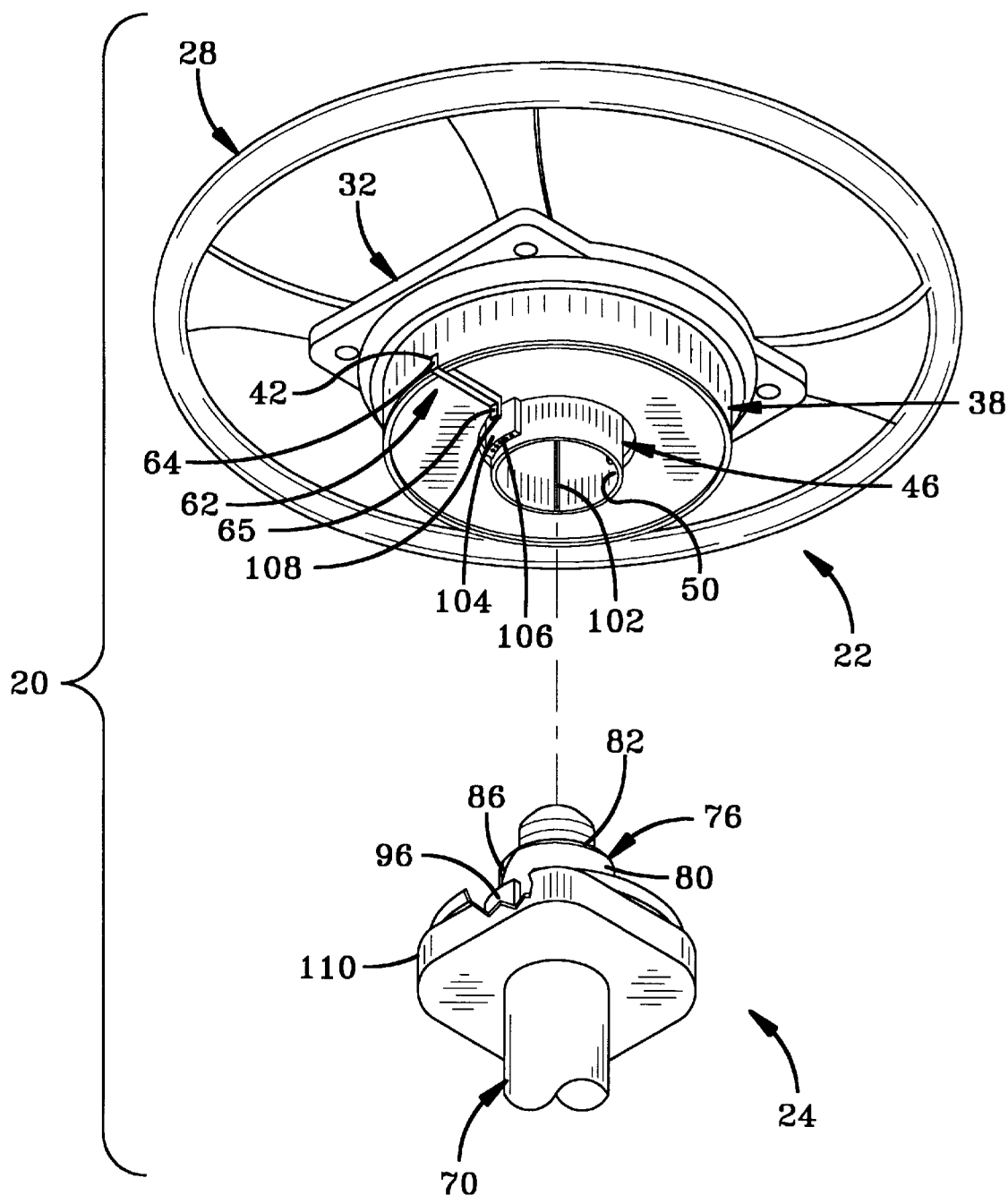
FIG. 3 is a perspective view of the assembled steering wheel assembly and the assembled steering column assemblies of FIG. 3.

As can be seen in FIG. 3, the steering wheel assembly 22 is first assembled, preferably by assembling the steering wheel armature 28 and airbag assembly 30 (not shown in FIG. 3) to the hub plate 32. Rotor 46 is rotatably mounted in the clockspring housing 38. The tabs 56 of the rotor 46 extend upwardly to the clockspring housing 38 and are secured by the retainer ring 36. Rotation of the steering wheel armature 28 and hub plate 32 relative to the second electrical connector body 104 and rotor 46 is prevented by the locking pin 62. The locking finger 64 of the locking pin 62 is disposed within the locking notch 42 of the clockspring housing 38, while the opposite end 65 of the locking pin 62 is disposed within the locking notch 108 in the second electrical connector body 104. The clockspring housing 38 is mounted to the hub plate 32. The steering column assembly is also assembled by inserting the steering shaft 70 through the collar assembly 76 and securing the collar assembly 76 to a surface 110, such as the steering column, dash or other surface which is non rotatable relative to the vehicle.

The steering wheel assembly 22 is then assembled onto the steering column assembly 24. First, the installer selects the steering wheel assembly 22 and brings it toward the steering column assembly 24 as shown in FIG. 3. The inner wall 50 of the rotor 46 is roughly aligned with the outer wall 80 of the collar assembly 76. The outer wall 80 of the collar assembly 76 is then inserted into the inner wall 50 of the rotor 46 to a first position in which the keys 102 formed on the inner surface of the inner wall 50 of the rotor 46 abut the abutment surface 82 of the outer wall 80 of the collar assembly 76.

The installer then rotates the steering wheel assembly 22 until he can feel the keys 102 are aligned with the axial guide 86, 88. The keys 102 slide along the abutment surface 82 into the axial guides 86, 88 as the installer rotates the steering wheel assembly 22 slightly and moves it forward axially to a second position in which the first electrical connector body 96 is rotationally aligned with and begins to engage the second electrical connector body 104. Upon further axial movement of the steering wheel assembly 22 toward the steering column assembly 24, the pins 106 of the second electrical connector body 104 are inserted into the pin sockets 98 of the first electrical connector body 96.

Figure 4:
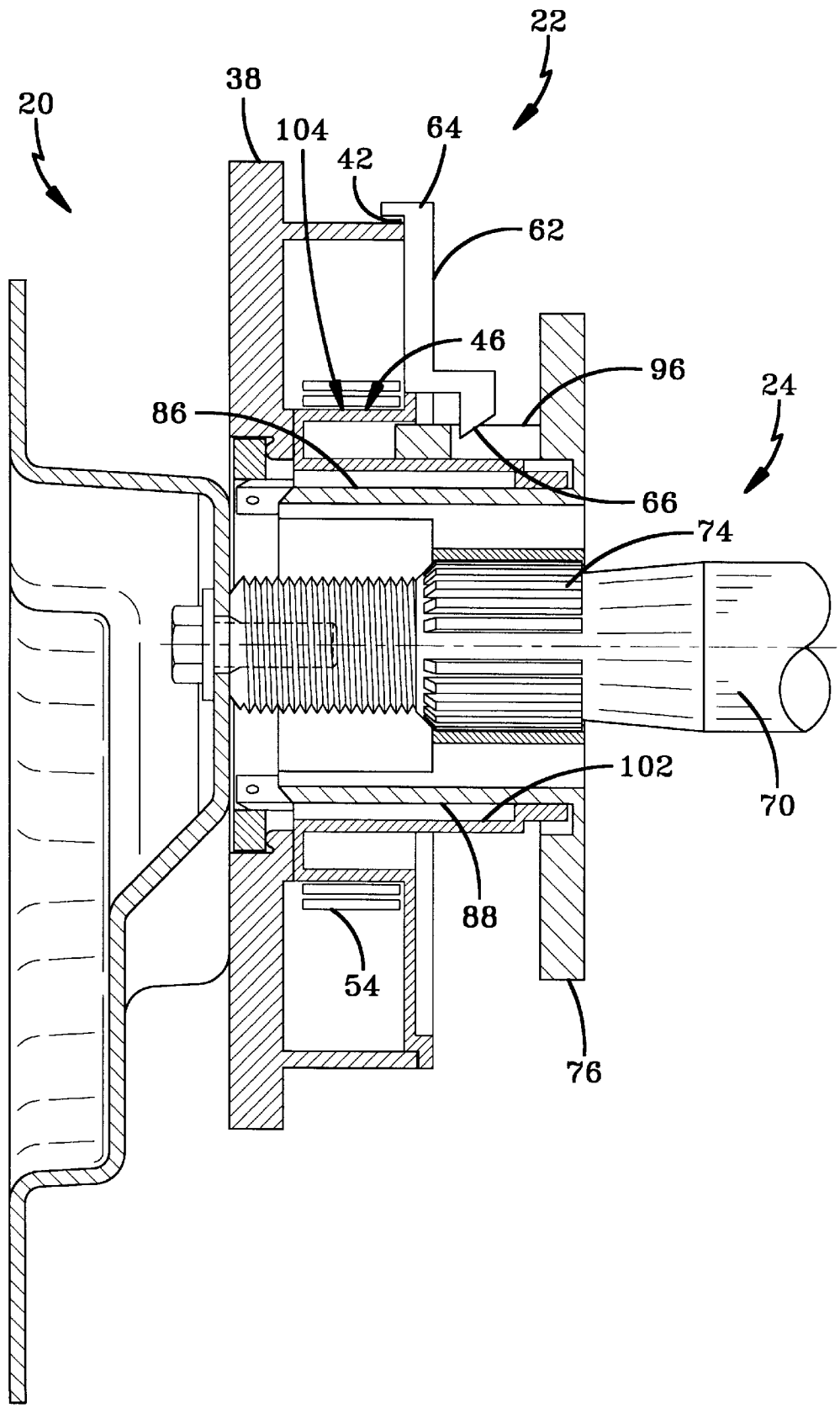
FIG. 4 is a sectional view of the steering wheel assembly of FIG. 3 installed onto the steering column assembly of FIG. 3.

After the first and second electrical connector bodies 96, 104 are at least partially engaged, the first electrical connector body 96 contacts the ramped surface 66 of the locking pin 62 forcing the locking pin 62 radially outwardly, as shown in FIG. 4. The locking finger 64 is thus no longer disposed within the locking notch 42 of the clockspring housing 38, thereby permitting relative rotation of the clockspring housing 38 and the second electrical connector body 104 formed on the rotor 46. The first electrical connector body 96 is fully engaged with the second electrical connector body 104 thereby connecting the ribbon wire 54 and any switches on the steering wheel assembly 22 to the vehicle via the first electrical connector body 96. The rotor 46 is rotationally locked with the collar assembly 76 because the keys 102 are disposed within the axial guides 86, 88 of the collar assembly 76. The steering wheel armature 28 and hub plate 32 are then rotated to properly align the hub plate 32 with the splines 74 on the shaft 70. The steering wheel assembly 22 is then secured to the steering column assembly 24, preferably by threading engaging a threaded gear (not shown) with the outer end 72 of the shaft 70 utilizing a worm tool, such as is described in copending application U.S. Ser. No. 08/522,627 filed Sep. 1, 1995, the assignee of which is the assignee of the present invention.

It should be apparent, as an alternative embodiment, that the clockspring housing 38 could be formed on the steering column assembly 24. Further, the keys 102 and axial guides 86, 88 could be formed on either the steering wheel assembly 22 or the steering column assembly 24. In the illustrated embodiments, the mating cylinder of the steering wheel assembly 22 is the inner wall 50 of the rotor 46, and the mating cylinder of the steering column assembly 24 is the outer wall 80 of the collar assembly 76. It should be apparent that the male mating cylinder and female mating cylinder could be formed on either the steering wheel assembly 22 or the steering column assembly 24.

The vehicle steering assembly 20 of the present invention provides improved installation of the steering wheel assembly 22 onto the steering column assembly 24. The mating cylinders 50, 80 align the steering wheel assembly 22 to the steering column assembly 24. The steering wheel assembly 22 is then rotationally aligned to the steering column assembly 24 by the keys 102 and the axial guides 86, 88. The electrical connectors 96, 104 are then properly aligned and are engaged upon further axial movement of the steering wheel assembly 22. The vehicle steering assembly 20 of the present invention facilitates the installation of the steering wheel assembly 22 and prevents damage to any electrical connections or wires between the steering wheel assembly 22 and the steering column assembly 24.

In accordance with the provisions of the patent statutes, the present invention has been described in what is considered to represent a preferred embodiment. However, it should be noted that the invention can be practiced otherwise than as specifically illustrated and described without departing from its spirit or scope.

What is claimed is:

1. A method for installing a steering wheel assembly onto a vehicle steering column shaft including the steps of:
   a) assembling a steering wheel assembly;
   b) assembling a steering column assembly including said steering column shaft and one of a first mating cylinder and a second mating cylinder having an outer diameter less than said first mating cylinder, said steering wheel assembly including the other of said first mating cylinder and said second mating cylinder, one of said first and second mating cylinders having a key complementary to a guide on the other of said first mating cylinder and said second mating cylinder;
   c) inserting said second mating cylinder into said first mating cylinder to a first position;
   d) after said step c) rotating said steering wheel assembly relative to said steering column assembly, thereby causing relative rotation between said first and second mating cylinders, to align said key to said guide; and
   e) moving said steering wheel assembly axially toward said steering column shaft past said first position to a second position after beginning said step d).

2. The method of claim 1 further including the steps of:
   f) connecting a first electrical connector on said steering wheel assembly to a second electrical connector on said steering column assembly during said step e); and
   g) preventing connection of said first and second electrical connectors in said step f) until after said step d).

3. The method of claim 1 wherein said step d) is at least partially performed during said step e).

4. The method of claim 1 wherein said guide is formed on an outer surface of said second mating cylinder, said key being formed on an inner surface of said first mating cylinder.

5. The method of claim 1 wherein said guide extends axially from an outer end, said guide tapering inwardly away from said outer end.

6. The method of claim 1 wherein said other of said first and second mating cylinders having said guide includes an abutment surface on an axial outer end, said abutment surface extending circumferentially about said outer end, said abutment surface tapering axially away from said outer end to form said guide, said key impinging said abutment surface during said step c), said key sliding along said abutment surface into said guide during said step d).

7. The method of claim 1 further including the steps of:
   f) mounting a clockspring housing on one of said steering wheel assembly and said steering column assembly, said clockspring housing including a first electrical connector;
   g) providing a second electrical connector on the other of said steering wheel assembly and said steering column assembly;
   h) connecting said first electrical connector to said second electrical connector during said step e).

8. The method of claim 2 wherein said guide and said key perform said step g).

9. A method for installing a steering wheel assembly onto a vehicle steering column shaft including the steps of:
   a) assembling a steering wheel assembly;
   b) assembling a steering column assembly including said steering column shaft and one of a first mating cylinder and a second mating cylinder having an outer diameter less than said first mating cylinder, said steering wheel assembly including the other of said first mating cylinder and said second mating cylinder, one of said first and second mating cylinders having a key complementary to a guide on the other of said first mating cylinder and said second mating cylinder;
   c) locking said first electrical connector rotationally relative to said clockspring housing;
   d) inserting said second mating cylinder into said first mating cylinder to a first position after said step c);
   e) rotating said steering wheel assembly relative to said steering column assembly, thereby causing relative rotation between said first and second mating cylinders, to align said key to said guide;
   f) moving said steering wheel assembly axially toward said steering column shaft past said first position to a second position;
   g) mounting a clockspring housing on one of said steering wheel assembly and said steering column assembly, said clockspring housing including a first electrical connector;
   h) providing a second electrical connector on the other of said steering wheel assembly and said steering column assembly;
   i) connecting said first electrical connector to said second electrical connector during said step f);
   j) unlocking said first electrical connector rotationally relative to said clockspring housing after said step i).

10. The method of claim 9 wherein said clockspring housing is mounted on said steering wheel assembly.

11. A steering wheel assembly comprising:

a steering wheel assembly including a first mating cylinder, said steering wheel assembly further including a first electrical connector;

a steering column assembly including a second electrical connector, and a second mating cylinder mateable to said first mating cylinder, one of said first and second mating cylinders having a key complementary to an axial guide on the other of said first mating cylinder and said second mating cylinder, said first electrical connector aligning with said second electrical connector when said key is aligned with said axial guide, an abutment surface preventing contact of said first and second electrical connectors until said key is aligned with said axial guide, said other of said first and second mating cylinders having said guide including said abutment surface on an axial outer end, said abutment surface extending circumferentially about said outer end, said abutment surface tapering axially away from said outer end to form said guide, said key impinging said abutment surface and sliding along said abutment surface into said guide during mating of said first and second mating cylinders.

12. The steering wheel assembly of claim 11 further including a clockspring housing on one of said steering wheel assembly and said steering column assembly, said clockspring housing including one of said first and second electrical connectors.

13. The steering wheel assembly of claim 12 wherein said clockspring housing is formed on said steering wheel assembly, said clockspring housing including said first electrical connector.

14. The steering wheel assembly of claim 11 wherein said guide is formed on an outer surface of said one of said second mating cylinder, said key being formed on an inner surface of said first mating cylinder.

15. The steering wheel assembly of claim 11 wherein said guide extends axially from an outer end, said guide tapering inwardly away from said outer end.

16. A method for installing a steering wheel assembly onto a vehicle steering column shaft:

a) assembling a steering wheel assembly including a first electrical connector;

b) assembling a steering column assembly including said steering column shaft and a second electrical connector, said steering column assembly including one of a first mating cylinder and a second mating cylinder having an outer diameter less than said first mating cylinder, said steering wheel assembly including the other of said first mating cylinder and said second mating cylinder;

c) inserting said second mating cylinder into said first mating cylinder to a first position;

d) rotating said steering wheel assembly relative to said steering column assembly to align said first and second electrical connectors after said step c);

e) moving said steering wheel assembly axially toward said steering column shaft past said first position to a second position after said step d); and f) connecting said first electrical connector on said steering wheel assembly to said second electrical connector on said steering column assembly during said step e).

17. The method of claim 16 wherein said step d) is at least partially performed during said step e).

18. The method of claim 16 further including the steps of:

g) mounting a clockspring housing on one of said steering wheel assembly and said steering column assembly, said clockspring housing including one of said first electrical connector and said second electrical connector;

h) connecting said first electrical connector to said second electrical connector during said step e).

19. The method of claim 18 further including the steps of:

i) locking said one of said first and second electrical connectors rotationally relative to said clockspring housing before said step c);

j) unlocking said one of said first and second electrical connectors rotationally relative to said clockspring housing after said step h).

20. The method of claim 18 wherein said clockspring housing is mounted on said steering wheel assembly.

21. A method for installing a steering wheel assembly onto a vehicle steering column shaft:

a) assembling a steering wheel assembly;

b) assembling a steering column assembly including said steering column shaft, said steering column assembly and said steering wheel assembly each including a complementary mating cylinder, said steering wheel assembly and said steering column assembly each including an electrical connector;

c) mounting a clockspring housing on one of said steering wheel assembly and said steering column assembly;

d) locking one of said electrical connectors rotationally relative to said clockspring housing;

e) mating said mating cylinders after said step d);

f) connecting said electrical connector on said steering wheel assembly to said electrical connector on said steering column assembly; and g) unlocking said electrical connector rotationally relative to said clockspring housing after said step f).

22. The method of claim 21 further including the steps of:

h) inserting one of said mating cylinders into the other of said mating cylinders to a first position;

i) rotating said steering wheel assembly relative to said steering column assembly to align said electrical connectors after said step h);

j) moving said steering wheel assembly axially toward said steering column shaft past said first position to a second position after beginning said step i); and k) connecting said electrical connector on said steering wheel assembly to said electrical connector on said steering column assembly during said step j).

* * * * *